(12) United States Patent
Gunawan et al.

(10) Patent No.: US 10,924,872 B2
(45) Date of Patent: Feb. 16, 2021

(54) AUXILIARY SIGNAL FOR DETECTING MICROPHONE IMPAIRMENT

(71) Applicant: Dolby Laboratories Licensing Corporation, San Francisco, CA (US)

(72) Inventors: David Gunawan, Sydney (AU); Glenn N. Dickins, Como (AU)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 0 days.

(21) Appl. No.: 16/079,071

(22) PCT Filed: Feb. 16, 2017

(86) PCT No.: PCT/US2017/018039
§ 371 (c)(1),
(2) Date: Aug. 22, 2018

(87) PCT Pub. No.: WO2017/146970
PCT Pub. Date: Aug. 31, 2017

(65) Prior Publication Data
US 2019/0045312 A1 Feb. 7, 2019

Related U.S. Application Data

(60) Provisional application No. 62/298,582, filed on Feb. 23, 2016.

(51) Int. Cl.
*H04R 29/00* (2006.01)
*H04M 3/56* (2006.01)
(Continued)

(52) U.S. Cl.
CPC ........ *H04R 29/005* (2013.01); *G10L 21/0232* (2013.01); *H04M 1/6033* (2013.01);
(Continued)

(58) Field of Classification Search
CPC ...... H04R 29/005; H04R 3/005; H04R 1/406; H04M 1/6033; H04M 3/568; G10L 21/0232
See application file for complete search history.

(56) References Cited

U.S. PATENT DOCUMENTS 7,206,421 B1  4/2007  Taenzer
7,565,288 B2  7/2009  Acero
(Continued)

FOREIGN PATENT DOCUMENTS

EP  2608198  6/2013
EP  2757765  7/2014
(Continued)

OTHER PUBLICATIONS

Cohen, "Noise Spectrum Estimation in Adverse Environments: Improved Minima Controlled Recursive Averaging", 2003, IEEE Transactions of Speech and Audio Processing, vol. 11, No. 5, p. 466-p. 475 (Year: 2003).*

(Continued)

*Primary Examiner* — Ping Lee

(57) ABSTRACT

Described herein are audio capture systems and methods. One embodiment provides an audio capture system (1) including: microphones (9-11) positioned to capture respective audio signals from different directions or locations within an audio environment; a mixing module (7) configured to mix the audio signals in accordance with a mixing control signal to produce an output audio mix, wherein, upon the detection of vibration activity, the mixing control signal controls the mixing module (7) to selectively temporarily modify one or more of the audio signals to reduce the presence of noise associated with vibration activity in the output audio mix.

17 Claims, 7 Drawing Sheets

(51) Int. Cl.
*H04R 1/40* (2006.01)
*H04R 3/00* (2006.01)
*H04M 1/60* (2006.01)
*G10L 21/0232* (2013.01)

(52) U.S. Cl.
CPC ............ *H04M 3/568* (2013.01); *H04R 1/406* (2013.01); *H04R 3/005* (2013.01)

(56) References Cited

U.S. PATENT DOCUMENTS

| | | | |
|---|---|---|---|
| 8,340,309 | B2 | 12/2012 | Burnett |
| 8,411,880 | B2 | 4/2013 | Wang |
| 8,666,082 | B2 | 3/2014 | Dreifus |
| 8,781,137 | B1 | 7/2014 | Goodwin |
| 8,855,330 | B2 | 10/2014 | Taenzer |
| 8,989,815 | B2 | 3/2015 | Truong |
| 2012/0128164 | A1* | 5/2012 | Blamey .................... H04R 5/04 381/28 |
| 2012/0284022 | A1 | 11/2012 | Konchitsky |
| 2013/0022216 | A1 | 1/2013 | Ganong, III |
| 2013/0024194 | A1 | 1/2013 | Zhao |
| 2013/0343555 | A1* | 12/2013 | Yehuday ............. G10L 21/0208 381/71.1 |
| 2014/0126737 | A1 | 5/2014 | Burnett |
| 2014/0274218 | A1 | 9/2014 | Kadiwala |
| 2015/0296319 | A1* | 10/2015 | Shenoy .................... H04S 7/302 381/303 |
| 2016/0232920 | A1* | 8/2016 | Matheja ................. H04R 3/005 |

FOREIGN PATENT DOCUMENTS

| | | |
|---|---|---|
| WO | 2001/037519 | 5/2001 |
| WO | 2015/047308 | 4/2015 |
| WO | 2015/130283 | 9/2015 |

OTHER PUBLICATIONS

Gauthier, P. et al. "Sound Field Capture with Microphone Arrays, Proximity Microphones, and Optimal Filters", Aug. 26, 2014, located via AES.org, Affiliations: Université de Sherbrooke, Sherbrooke, Canada; Centre for Interdisciplinary Research in Music, Media, and Technology, McGill University, Montreal, Quebec, Canada(See document for exact affiliation information.), AES Conference:55th International Conference: Spatial Audio (Aug. 2014), Paper No. 1-1 Permalink Import into BibTeX, Subject:Spatial Sound Techniques, pp. 1-8.

Santiago, R. et al. "Integration of Automatic Microphone Selection with Acoustic Echo Cancellation", Nov. 1996, located via Google Scholar, Affiliation: Shure Brothers Inc., Evanston, IL AES Convention:101 (Nov. 1996) Paper No. 4368 Import into BibTeX Publication Date:Nov. 1, 1996 Subject:Signal Processing, pp. 1-23.

Przywara, L. et al. "Group Report: Using Sensor Data to Improve the user experience of Audio Applications", Oct. 10, 2013, Retrieved from the internet:URL:http:/www.projectbarbq.com/reports/bbq13/project_Bar-B-Q_2013_report_section_6.pdf. (retrieved on May 8, 2014)the whole document.

* cited by examiner (Prior Art)

AUXILIARY SIGNAL FOR DETECTING MICROPHONE IMPAIRMENT

CROSS-REFERENCE TO RELATED APPLICATION(S)

The present application claims priority to U.S. Provisional Patent Application No. 62/298,582, filed Feb. 23, 2016, and European Patent Application No. 16156926.4, filed Feb. 23, 2016, both of which are incorporated herein by reference in their entirety.

TECHNOLOGY

The present Application relates to audio signal processing. More specifically, embodiments of the present invention relate to detection of microphone impairment in audio conferencing systems.

While some embodiments will be described herein with particular reference to that application, it will be appreciated that the invention is not limited to such a field of use, and is applicable in broader contexts.

BACKGROUND

Any discussion of the background art throughout the specification should in no way be considered as an admission that such art is widely known or forms part of common general knowledge in the field.

Audio conferencing devices exist to capture the sound from a given room to transport the audio to others interacting on a call. However, to properly capture the sound of all the participants in a room, there is often a need to distribute multiple microphones in a room. Sometimes this is done by placing multiple microphones in a system or unit of known geometry such as a desk-mounted audio hosting device as illustrated in FIG. 1. However, at other times, microphones can be distributed around a room in an ad-hoc manner depending on the users' preferences for each call and/or particular characteristics of the device and related modular microphone system being used.

In these distributed microphone cases, the objective is still to capture the sound in the room, but the audio processing unit is unaware of the physical distribution of the microphones and has to select which microphones to use based on the audio signals it receives. Such a system is robust and more preferable to relying on specific geometry and beam-forming, since generally there will be at least one microphone placed close to the desired sound source at any point in time. Additionally, such systems allow users to freely move and adapt microphones towards achieving at least one microphone being close to each sound sources of interest at any point in time—for example some systems incorporate wireless portable or hand held microphones as part of such a dynamic microphone array.

A common approach to microphone selection is based on signal to noise ratios (SNR). In this approach, the SNR of each microphone input signal is analyzed and microphone selection is often based on signals which have the highest SNR. Such an approach is feasible and effective where the loudest audio signals are of primary interest, and all audio in the given environment (or room) relates to the same scene, content or, for example, meeting. This is often the case in audio conferencing systems, where a main unit and/or distributed microphones are used to capture one audio representation of the activity and speech from participants in that room. In such situations, it is reasonable that either the speech to be heard, or some other sound of interest is primarily the loudest sound being heard by the largest number of participants in the room. Where there are significant and ongoing sounds that are louder than the desired participants' speech, then this is another class of audio processing problem not related to this work. In such a case of chronic loud noise, the beam forming approaches are more suitable. Generally, for the envisaged application of this work, it is intended that rooms with chronic loud noises would not be popular for hosting teleconferencing meetings.

The selection or more generally mixing of microphone inputs based on SNR can however be problematic when a particular microphone is being physically handled or subject to some mechanical noise arising from activity and vibrations closest to that microphone. In this case, whilst such noise is not overly loud to the majority of the room, such handling noise or proximate sound can appear as the highest SNR signal across the set of available microphones, giving that noise impaired microphone preference over other microphones. This is undesirable from an audio conferencing perspective as it amplifies unwanted noise. A specific and problematic example of this is when an idle participant in a meeting begins to handle the microphone module or an object nearby, effectively preventing the system from capturing the desired audio from another part of the room. Whilst the vibration and/or handling noise can be quite significant as detected by an acoustic microphone in the satellite or other module, the sounds may be of no concern to those in the room. In a conventional audio conferencing system, this scenario of enhanced noise signals requires a far end participant to complain about the noise or lack of intelligibility before the problem is even identified. To address the noise problem typically requires an effort to identify which microphone and what the offending noise source is prior to physical action to reduce or cease the origin of the noise. Whilst the additional microphones may offer benefit in some situations, the problem described here often leads to a reluctance to effectively use larger numbers of satellite microphones.

This is shown schematically in FIG. 2, which illustrates a microphone selection or mixing system in a conference room. Person A is speaking whilst Person B is touching or moving objects near one of the microphone modules. Whilst the acoustic sound of the activity of person B may not be problematic, such mechanical vibrations of very close activity biases the microphone selection or mixing and therefore distorts, corrupts or even eliminates the desired audio from person A being retained in the output audio mix.

Reference is made to U.S. Pat. No. 7,206,421 to GN ReSound North America Corporation entitled "Hearing System Beamformer", where the desired audio is reasonably present at all microphones. In such a situation, any excess or louder sound at one microphone may lead to that microphone being removed from the mix. This approach is generally more applicable in situations where the desired sources have a similar and fairly consistent signal level across a set of microphones, such that unexpectedly high signal energy at any microphone is deemed to be interference. In particular, this approach is useful when the desired sound is in the far field and the noise is close to a particular microphone. In this case, we are considering a room where the microphones and participants are somewhat interspersed, and so the desired sound cannot be considered in the far field, and there is no valid assumption of the desired audio being reasonably present at a similar level at all microphones.

U.S. Pat. No. 7,206,421 presents two general approaches where differences in the relatively instantaneous signal level at microphones is used to determine whether a detected audio signal is undesired or indicative of interference. It is clear that the situation of distributed microphones in a room comprising one audio scene (such as an audio conference) is not amenable to either of these solutions. At once, there are times when the desired audio signal is significantly louder at one microphone and it is desirable to use this microphone preferentially as a better capture of the event. And there are other times, where an undesired audio signal is significantly louder at one microphone due to local mechanical or closely coupled interference.

Therefore, there is a desire for improved techniques for capturing audio signals in an audio conferencing system.

SUMMARY OF THE INVENTION

In accordance with a first aspect of the present invention there is provided an audio capture system including:
  two or more microphone modules for capturing audio signals from different directions or locations within an audio environment, at least one of the microphone modules comprising a microphone and a vibration sensor for detecting vibrations of said module, the vibration sensor comprising at least one of a contact microphone and an accelerometer;
a mixing module configured to mix the audio signals of the microphone modules to produce an output audio mix, wherein
  the mixing module is configured to determine the gain of each audio signal in the output audio mix based on a measure of the signal to noise ratio, SNR, of the corresponding audio signal, wherein said measure of the SNR is weighted by a weighting factor that is inversely proportional to an amplitude of a vibration signal generated by the corresponding vibration sensor.

In an embodiment, the gain increases as the weighted measure of the SNR of the corresponding audio signal increases. Likewise, the gain decreases as the weighted measure of the SNR of the corresponding audio signal decreases.

In some embodiments the measure of the SNR of an audio signal corresponds to a power of the audio signal. In some embodiments the measure of the SNR of an audio signal corresponds to the signal-to-noise ratio of the audio signal.

In the context of the invention, 'mixing' relates to adding at least two audio signals according to a set of gains, i.e. a gain is specified for each of the audio signals. In an example of discrete signals, this may be expressed as $s_{output}[n] = \Sigma(g_{i,n} s_i[n])$, wherein $s_{output}[n]$ is the output audio mix, $s_i[n]$ is the audio signal of microphone module $i$, $g_{i,n}$ is the gain for microphone module i at sample n, and the summation is over all microphones modules i. The gain may vary over time. Typically, the sum of the gains is equal to 1, or at least to some constant value, i.e. $\Sigma g_{i,n}$ is constant, and typically equal to 1, for all n.

In one embodiment the mixing module is configured to determine the gain of each audio signal in the output audio mix based on the weighted measure of the SNR of the corresponding audio signal if input from one or more capacitive sensors adapted to detect proximate hand or user gestures is indicative of a vibration event.

In one embodiment the mixing module is configured to determine the gain of each audio signal in the output audio mix based on the weighted measure of the SNR of the corresponding audio signal if input from one or more optical sensors adapted to detect movement of objects or people proximal to one or more microphones is indicative of a vibration event.

In one embodiment mixing module is configured to determine the gain of each audio signal in the output audio mix based on the weighted measure of the SNR of the corresponding audio signal if input from one or more acoustic ranging sensors adapted to detect movement of objects or people proximate to one or more microphones is indicative of a vibration event.

In one embodiment mixing module is configured to determine the gain of each audio signal in the output audio mix based on the weighted measure of the SNR of the corresponding audio signal if a covariance or correlation calculated between the audio signal input from two or more microphone modules is indicative of a vibration event.

In some embodiments the two or more microphone modules are positioned arbitrarily within the audio environment.

The vibration event preferably includes one or more of direct vibrations, inferred vibrations, direct movement or inferred movement.

In accordance with a second aspect of the present invention there is provided a mixing module for an audio capture system. The mixing module is configured to receive audio signals from two or more microphone modules of the audio capture system, to receive a vibration signal from a vibration sensor of at least one of the microphone modules for detecting vibrations of said module, the vibration sensor comprising at least one of a contact microphone and an accelerometer, and to mix the received audio signals of the microphone modules to produce an output audio mix. The mixing module is configured to determine the gain of each audio signal in the output audio mix based on a measure of the signal to noise ratio, SNR, of the corresponding audio signal, wherein said measure of the SNR is weighted by a weighting factor that is inversely proportional to an amplitude of the vibration signal received from the corresponding vibration sensor.

In accordance with a third aspect of the present invention there is provided a method, the method including the steps of:
receiving audio signals captured by two or more microphone modules from different directions or locations within an audio environment,
receiving a vibration signal from a vibration sensor included in at least one of the microphone modules for detecting vibrations of said module, the vibration sensor comprising at least one of a contact microphone and an accelerometer; and
mixing the received audio signals to produce an output audio mix, by:
determining the gain of each of the received audio signals in the output audio mix based on a measure of the signal to noise ratio, SNR, of the corresponding audio signal, wherein said measure of the SNR is weighted by a weighting factor that is inversely proportional to an amplitude of the vibration signal received from the corresponding vibration sensor.

In accordance with a fourth aspect of the present invention there is provided non-transitory computer-readable storage medium having stored thereon computer-executable instruction for executing the method as described above.

BRIEF DESCRIPTION OF THE DRAWINGS

Example embodiments of the disclosure will now be described, by way of example only, with reference to the accompanying drawings in which.

DESCRIPTION OF EXAMPLE EMBODIMENTS

Overview

Figure 3:
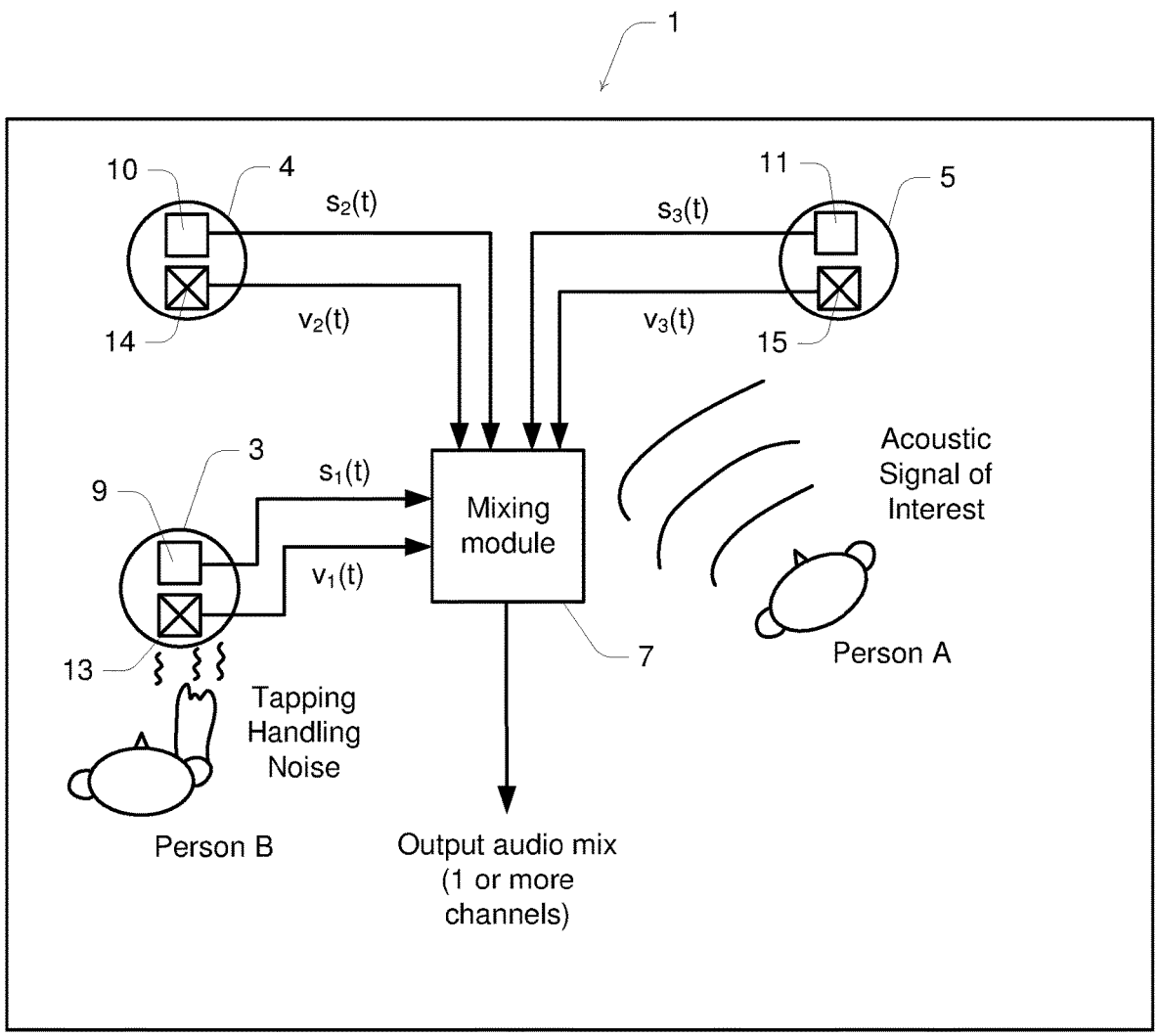
FIG. 3 is a schematic plan view of an audio capture system according to an embodiment of the invention.

Referring to FIG. 3 there is illustrated schematically an audio capture system 1 according to a first embodiment of the invention. System 1 includes three microphone modules 3-5 positioned at spatially separated locations around an audio environment to capture respective audio signals $s_1(n)$, $s_2(n)$, and $s_3(n)$ from different directions or locations within the audio environment. Here n represents units of discrete time. More generally, each microphone is positioned or oriented to capture audio information from different locations or directions within the audio environment. Thus, the microphones may be co-located within a single module but oriented at different directions to each other. A central mixing module 7 receives the audio signals, mixes the signals in accordance with a mixing control signal and mixing algorithms, and produces an output audio mix. Embodiments of the present invention are particularly adapted for audio conferencing systems wherein the audio environment represents an office conference room or the like. However, it will be appreciated that the present invention is not limited to this application and may be implemented in other applications such as multichannel recording of sound for film or authored content; multiple microphone capture on mobile phones, tablets or other portable devices, or any application where the user may make contact with a microphone or its enclosure. Some exemplary scenarios where these applications may have utility include:

Distributed capture using multiple mobile devices (cell phones), where the choice of which signals to use is somewhat guided by additional signal (such as movement or vibration sensing) on the device and not just the microphone input. This could happen offline (not in real time) if both the microphone and simultaneous additional signal is captured.

Capture of audio scene with operators of microphones (boom mics)

Conference activity (such as in talk shows with live audiences) where there are multiple microphones moving around the audience all wirelessly connected back and there is a desire to make sure the person asking the question is heard and not other noise.

Figure 1:
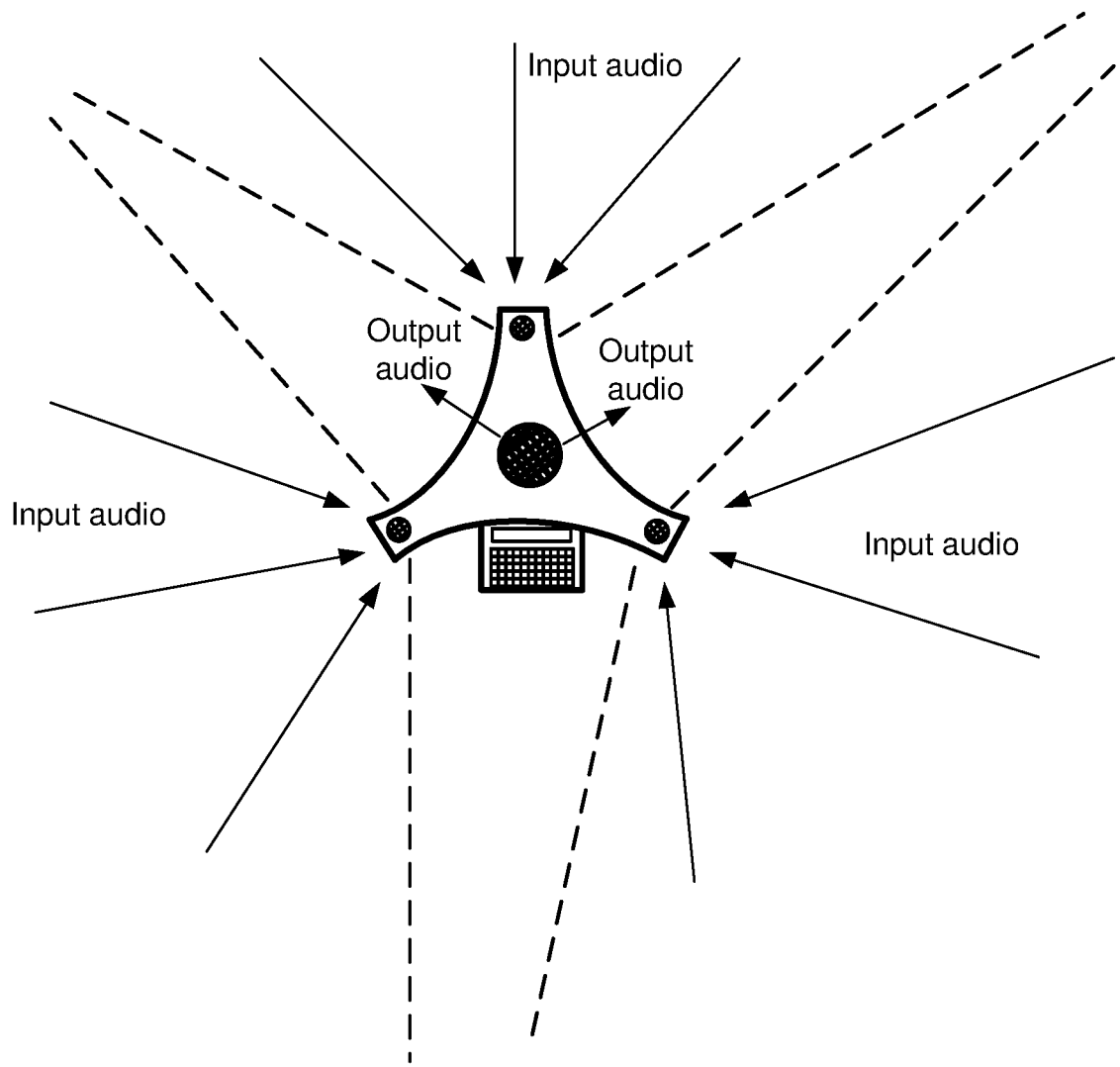
FIG. 1 is a schematic plan view of a table mounted audio hosting device.
Figure 2:
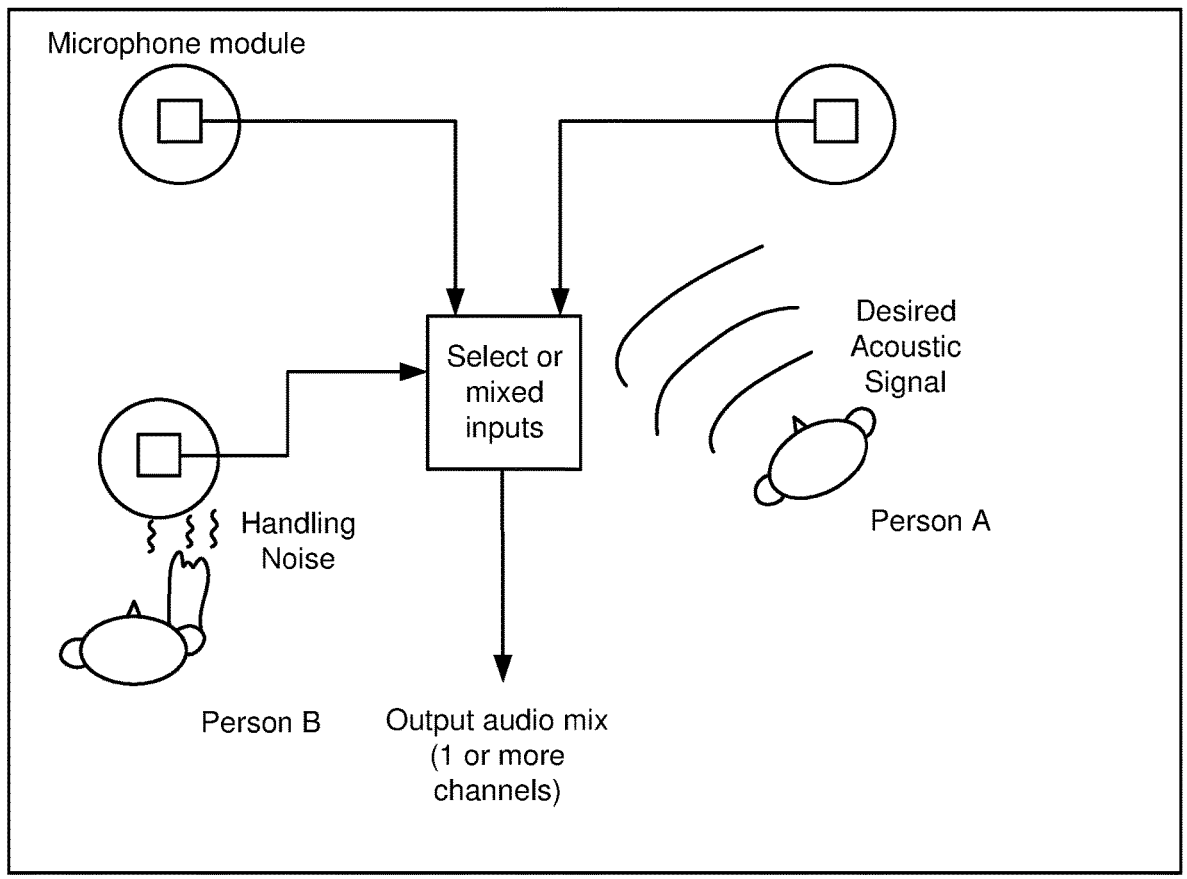
FIG. 2 is schematic plan view of an audio mixing system in a conference room illustrating an example nuisance audio situation.

In the present embodiments, modules 3-5 will typically include desk mountable units but may also include other designs such as ceiling mounted, wall mounted modules, portable modular microphones and hand held devices. Mixing module 7 is generally indicative of an audio mixing and processing device. In some embodiments, module 7 represents a standalone unit such as the desk-mounted unit illustrated in FIG. 1. This is particularly useful in audio conferencing systems which directly utilize the telephone network. In other embodiments, module 7 represents a computer processor such as a personal computer. This is particularly useful in audio conferencing systems which operate over the internet using Voice Over IP protocols. The output audio mix represents an audio signal that is sent to other remotely located members of a current audio conference (either over the telephone network, a local area network or over the internet).

Each module includes respective inbuilt microphones 9-11 for capturing respective audio signals. In other embodiments, each module may include multiple microphones positioned to capture audio information from different directions. Each module 3-5 also includes respective inbuilt vibration sensors 13-15 adapted to detect vibration activity and generate respective vibration signals $v_1(n)$, $v_2(n)$ and $v_3(n)$. Example vibration sensors include contact microphones, also known as piezo microphones, and accelerometers. Association of each microphone with a corresponding vibration sensor allows the microphones to be positioned arbitrarily within the audio environment.

Figure 4:
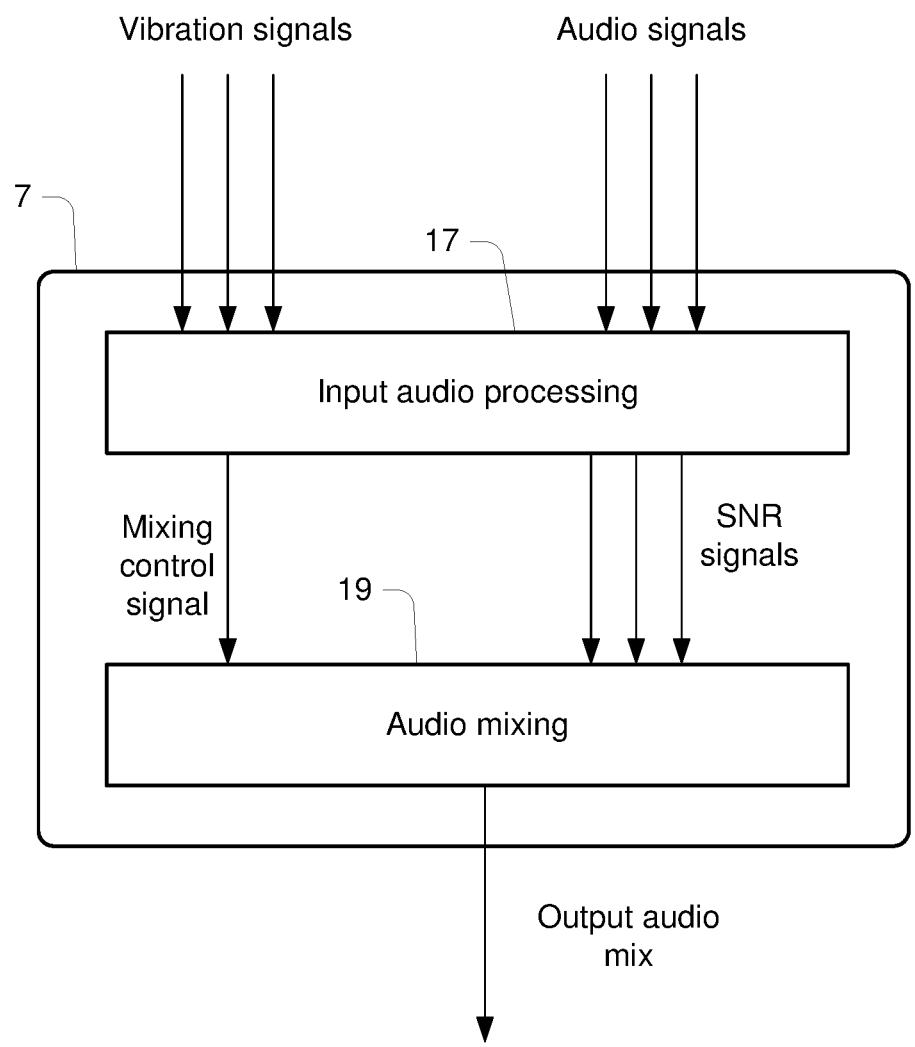
FIG. 4 is a schematic illustration of the signal processing performed by the mixing module.

As shown in FIG. 4, the mixing control signal is determined from, inter alia, the received vibration signals. Example vibration activity includes shifting of the modules themselves, movement of objects close to one of the microphones or other activity giving rise to mechanical vibrations. Mechanical vibrations are detected by the microphones and manifested as associated acoustic noise which can drown out desirable audio signals in the output audio mix. In other embodiments or forms, the vibration activity may include variants of movement and vibration sensing such as absolute positioning (using GPS devices), orientation (using accelerometers), vibration (using accelerometers) or movement (using gyroscopes). As such, the vibration activity may represent direct vibrations (such as by using electro piezo vibration sensor devices, e.g. contact microphones), inferred vibrations inferred (such as using difference microphone), direct movement (such as by ultrasonic or microwave proximity movement sensors) or inferred movement (such as from accelerometers, gyroscopes or GPS devices). In some embodiments even GUI feedback may be used as indicators of vibration activity.

The vibration signals are used as control inputs for determining the mixing control signal and hence determining how to mix the audio signals into the output audio mix. As illustrated in FIG. 4, mixing module 7 receives both the audio signals and the vibration signals, and, at an input audio processing step 17, processes these signals to determine a signal to noise ratio (SNR) of each audio signal and to determine the mixing control signal. Mixing module 7 uses the signal to noise ratio (SNR) of audio signals and mixing control signal as a measure of how to mix the signals together in the output audio mix in an audio mixing step 19. In a simple microphone selection embodiment, only the audio signals having an SNR greater than a selection threshold are selected for the output audio mix and the remaining audio signals are fully suppressed. In a more flexible microphone mixing embodiment, signals having a higher SNR are given more weight in the output audio mix but each audio signal is considered in the mix. These two embodiments are discussed separately below. However, it will be appreciated that it is possible to use the core of the present invention with other microphone selection algorithms.

Microphone Selection Embodiment

In this embodiment, mixing module 7 selects only audio signals having a sufficient SNR to constitute the output audio mix, and preferably the signals are mixed equally. Consider system 1 of FIG. 3. If the instantaneous SNRs of audio signals $s_1(n)$, $s_2(n)$, and $s_3(n)$ are defined respectively as $I_1$, $I_2$ and $I_3$, then, absent any vibration detection, a selection ratio $r_1$ for microphone 9 is defined such that, at time instant n, $$r_1[n] = \frac{(I_1[n] + \alpha)}{(I_1[n] + \alpha) + I_2[n] + I_3[n]} \quad (1)$$

where $\alpha$ is a factor that is allowed to fluctuate depending on the number of observations seen where $r_1$ is greater than a threshold of selectivity $t_1$. The parameter $\alpha$ decreases with increasing numbers of observations, thereby adding hysteresis to the selectivity criterion of $s_1$. Similar selection ratios exist for microphones 10 and 11.

Thus when $r_1 > t_1$, $s_1$ is selected as a signal to transmit in the output audio mix. Similarly, if $r_2 > t_2$ or $r_3 > t_3$, signals $s_2$ or $s_3$ are also selected to form part of the output audio mix. $t_2$ and $t_3$ represent thresholds of selectivity for microphones 10 and 11 respectively. These thresholds may be separate or the same as $t_1$ based on the position and type of each microphone.

Under normal operation (without any mechanical vibrations, i.e. in absence of a vibration event), the output audio mix primarily includes high SNR audio signals from microphones close to current speaking members of the audio conference. Audio signals from more distant microphones have a lower SNR and do not reach the required threshold of activity. Thus, these lower SNR signals are temporarily suppressed from the output audio mix.

Now, using the auxiliary vibration signals $v_1(n)$, $v_2(n)$ and $v_3(n)$ corresponding to vibration sensors 13-15, equation (1) can be augmented as follows to factor in an amount of mechanical noise being picked up by the microphone module 3:

$$r_1[n] = \frac{\frac{(I_1[n] + \alpha)}{V_1[n]}}{\frac{(I_1[n] + \alpha)}{V_1[n]} + \frac{I_2[n]}{V_2[n]} + \frac{I_3[n]}{V_3[n]}} \quad (2)$$

where $V_i[n] = \beta v_i[n] + (1-\beta) v_i[n-1]$ is a smoothed version of the vibration signal of microphone module i and $\beta$ represents a smoothing factor to smooth the signal with a time constant in the range of 50 ms to 500 ms. The subscripts 1, 2 and 3 represent the three microphone modules 3, 4 and 5 of system 1. Similar selection ratios apply for modules 4 and 5. Thus an increase in the vibration signal (representing the vibrational energy detected at a microphone module) reduces the selection ratio for a particular microphone. If the detected vibration is significant, the selection ratio will drop below the threshold level and that audio signal will be suppressed from the output audio, thereby removing acoustic noise from mechanical vibrations. The time constants of this detection system should be in the order of 50-500 ms to accurately detect and suppress vibration associated acoustic noise.

Figure 5:
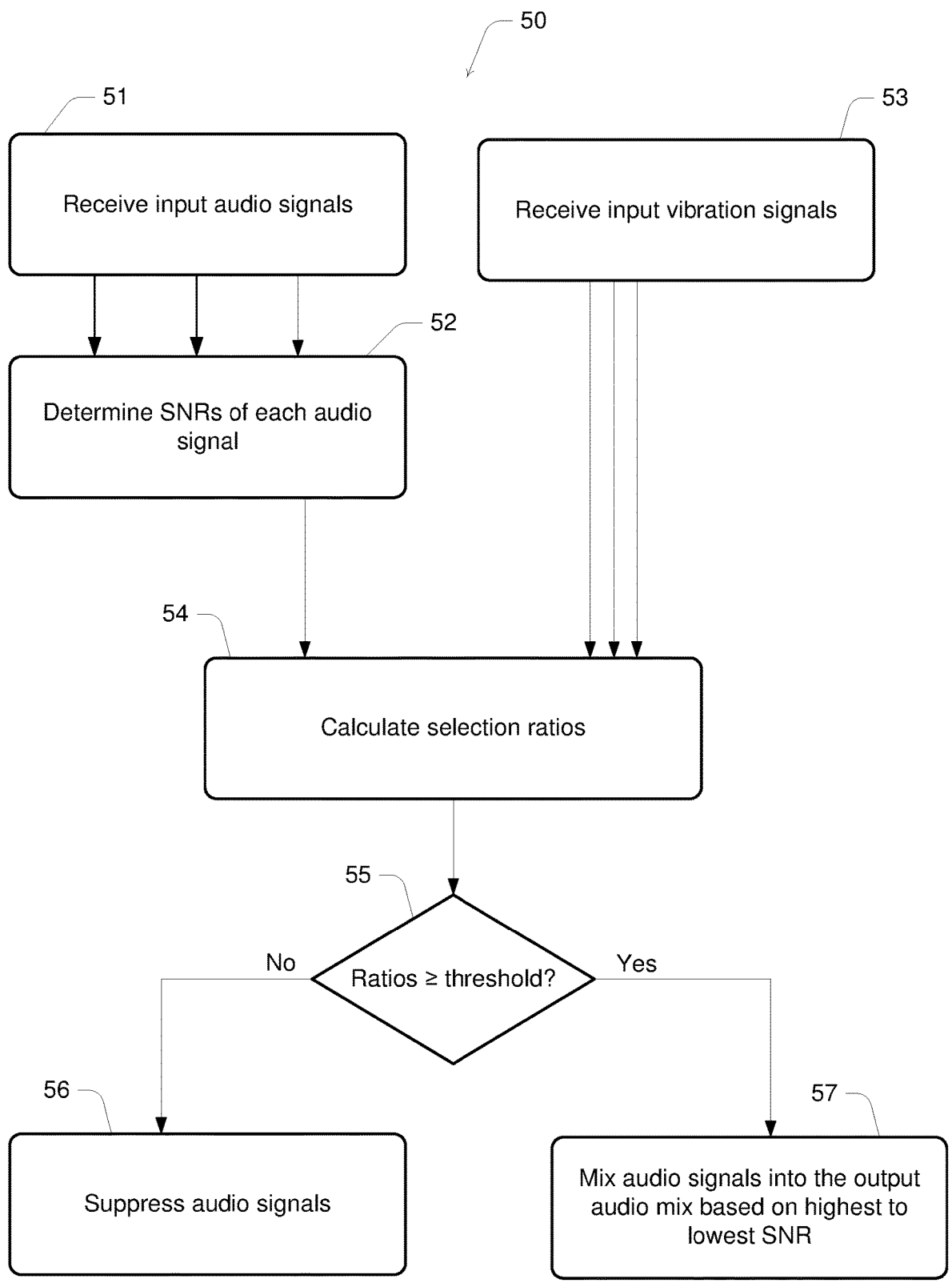
FIG. 5 is a process flow diagram illustrating the primary steps of an audio capture method according to a microphone selection embodiment of the invention.

An exemplary audio capture method 50 based on the above microphone selection technique is illustrated in FIG. 5. At initial step 51 the audio signals $s_1(n)$, $s_2(n)$, and $s_3(n)$ are captured by microphones 9-11. At step 52, these audio signals are converted to instantaneous SNRs. Simultaneously with steps 51 and 52, at step 53, auxiliary vibration signals $v_1(n)$, $v_2(n)$ and $v_3(n)$ are received from vibration sensors 13-15. The SNRs and input vibration signals are processed at step 54 as per equation (2) above to calculate selection ratios for each microphone module 3-5. At step 55, a determination is made as to whether or not each selection ratio is greater than or equal to respective predefined thresholds of selectivity. Audio signals having a selection ratio that is less than the predefined threshold of selectivity are suppressed from the output audio mix at step 56. Audio signals having a selection ratio that is greater than or equal to the predefined threshold are mixed into the output audio mix at step 57. Preferably the audio signals are mixed such that higher SNR signals have a greater weighting or contribution to the mix than signals of lower SNR.

Microphone Mixing Embodiment

In this embodiment, signals having a higher SNR are given more weight in the output audio mix but each audio signal is considered in the mix. The mixing control signal is responsive to the vibration signals to control mixing module 7 to selectively temporarily modify one or more of the audio signals to reduce the presence of acoustic noise associated with vibration activity in the output audio mix. Similar to the selection embodiment above, this is achieved in the mixing algorithm by weighting the audio signals corresponding to microphones in modules where the vibrations are detected. However, unlike the selection embodiment, the audio signal may not be fully suppressed but may only be reduced or attenuated to reduce its contribution to the output audio mix, i.e. reducing its gain in the output audio mix. This is illustrated in the following analysis.

A different selection ratio $r_i$ can be computed for each microphone module, and a mixing algorithm can be defined to combine the various signals $s_i$. For each module, the selection ratio is given by equation (2) above. The SNRs can then be sorted from highest to lowest and mixed together to form the output audio mix. A simple mixing operation to mix the audio signals based on the instantaneous SNRs would then be:

$$s_{transmit}[n] = r_k[n]s_k[n] + r_l[n]s_l[n] + r_m[n]s_m[n] \quad (3)$$

where $s_{transmit}[n]$ is the output audio mix to be sent and:

$$r_k[n] + r_l[n] + r_m[n] = 1. \quad (4)$$

Considering equation (2), by dividing the SNR of each audio signal by the (smoothed) vibration signal, the vibration signal is essentially modulating or contributing to the noise component of the SNR of the audio signals for that microphone module. Hence, during periods of enhanced vibrations from a vibration sensor, the SNR is reduced and the mixing module 7 temporarily attenuates or suppresses the audio signal from that corresponding microphone to reduce or remove the acoustic noise based on equations (2) and (3).

In addition to mixing the audio signals based on their instantaneous SNR, the audio signals can be mixed in other ways including based on Direct to Reverb Ratio or more complex algorithms which factor a conversational state of participants in the audio conference.

In addition to reducing or suppressing the contribution of an audio signal to the output audio mix, the mixing module 7 can perform other functions in response to detection of vibrations, including:

Providing a faster adaptation of acoustic echo canceller and suppressor coefficients.

Limiting automatic gain control updating for particular microphone modules.

Providing faster adaptation of direction of arrival estimates.

Accrual of events or activity to provide a longer term judgment of microphone module reliability and signal quality absent of vibration induced noise.

Figure 6:
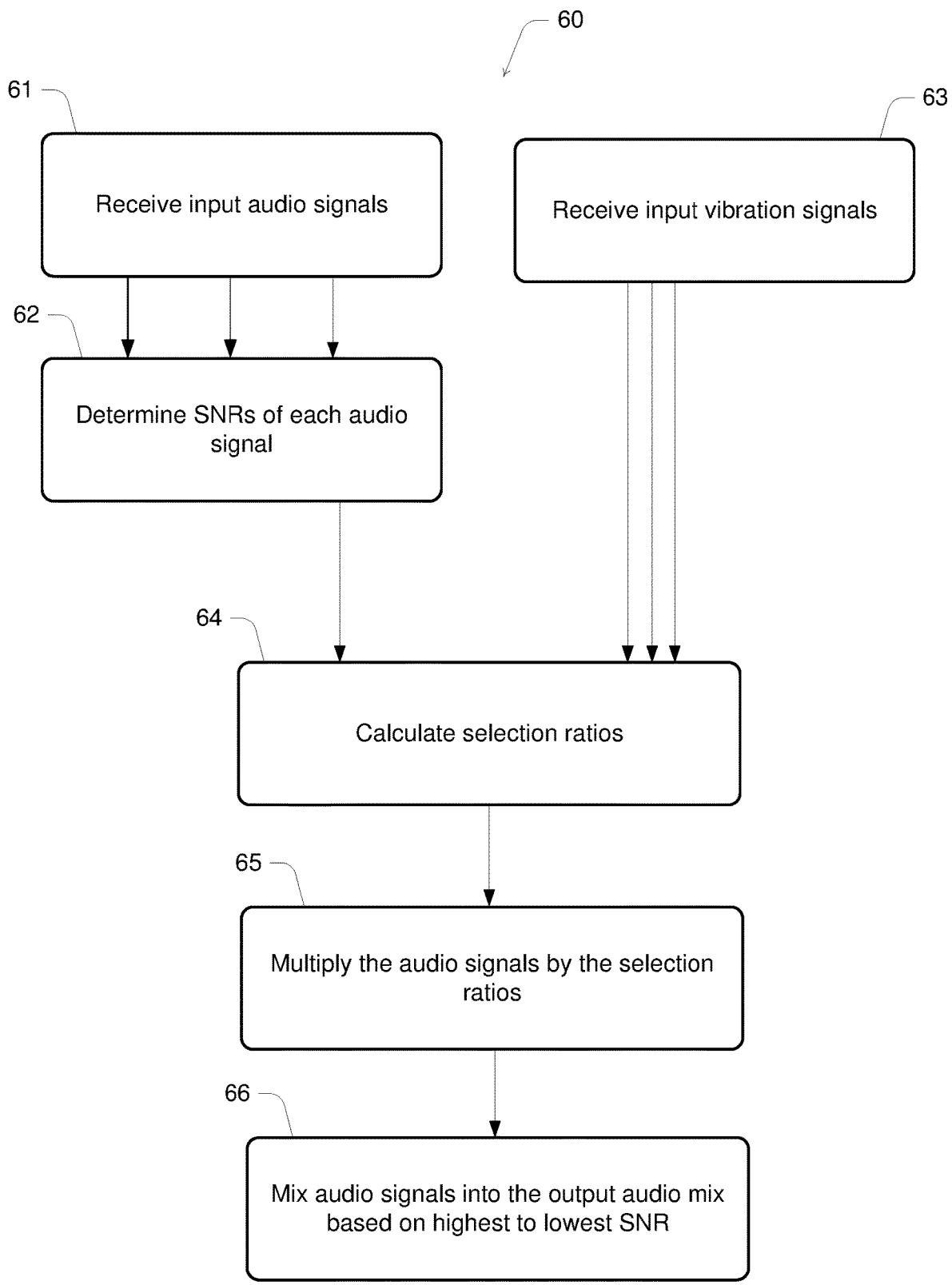
FIG. 6 is a process flow diagram illustrating the primary steps of an audio capture method according to microphone mixing embodiment of the invention.

An exemplary audio capture method 60 based on the above microphone mixing technique is illustrated in FIG. 6. At initial step 61 the audio signals $s_1(n)$, $s_2(n)$, and $s_3(n)$ are captured by microphones 9-11. At step 62, these audio signals are converted to instantaneous SNRs. Simultaneously with steps 61 and 62, at step 63, auxiliary vibration signals $v_1(n)$, $v_2(n)$ and $v_3(n)$ are received from vibration sensors 13-15. The SNRs and input vibration signals are processed at step 64 as per equation (2) above to calculate selection ratios for each microphone module 3-5. At step 65, each audio signal is multiplied by its corresponding normalized selection ratio to determine its contribution to the output audio mix. Signals having a high SNR and a low corresponding vibration signal will have a greater selection ratio and hence greater contribution to the output audio mix. Finally, at step 66, the audio signals are mixed together to form the output audio mix.

Event Based Microphone Selection Embodiment

In addition to providing instantaneous (in real-time or near real-time) adjustment of the contribution of each audio signal to the output audio mix, mixing module 7 may continuously monitor the signals ($s_i$ and $v_i$) from each module and incorporate the detection of handling events using both the microphones and vibration sensors. Rather than incorporating the vibration sensor signals $v_i$ into the mixing or selection algorithm directly, the system would keep track of the level of handling activity that has occurred on a given microphone module. By way of example, a suitable event for monitoring is the occurrence when the vibration signal equals or exceeds the associated threshold $v_i \geq t_i$. In some embodiments, mixing module 7 may be responsive to the mixing control signal to operate in either a 'normal' mixing mode of operation in the absence of vibration activity (when the vibration signals are below the threshold—$v_i \geq t_i$) and a 'vibration' mixing mode of operation upon detection of vibration activity (when at least one of the vibration signals is equal to or exceeds the associated threshold—$v_i \geq t_i$). In these different modes, mixing module 7 may implement different mixing algorithms. In an exemplary embodiment, in the 'normal' mixing mode of operation the mixing module may be configured to determine the gain for each audio signal on the basis of a measure of a signal-to-noise ratio of said audio signal, i.e. without weighting said measure using the vibration signal, whereas in the 'vibration' mixing mode of operation the mixing module may be configured to determine the gain for each audio signals on the basis of a measure of an SNR ratio of said audio signal weighted by a weighting factor that is inversely proportional to an amplitude of the vibration signal of the vibration sensor of the corresponding module.

This approach has the advantage of requiring only a simple detection of handling. To prevent false alarms, the system may require that two or more events are registered within a given amount of time, and at this point deem that particular module impaired or in a state of nuisance and not consider it at all in any selection or mixing that would otherwise be based on the acoustic signals $s_i$.

Other Vibration Event Detection

In some embodiments, the vibration signals can be replaced or supplemented with further inputs to the mixing control signal. These additional inputs include:

Signals from one or more capacitive sensors adapted to detect proximate hand or user gestures that give rise to a vibration event. For example, a vibration event is detected if a signal from the one or more capacitive sensors satisfies a predetermined threshold condition, e.g. exceeds a threshold.

Signals from one or more optical sensors adapted to detect movement of objects or people proximal to one or more microphones that gives rise to a vibration event. For example, a vibration event is detected if a signal from the one or more optical sensors satisfies a predetermined threshold condition, e.g. exceeds a threshold.

Signals from one or more acoustic ranging sensors adapted to detect movement of objects or people proximate to one or more microphones that gives rise to a vibration event. For example, a vibration event is detected if a signal from the one or more acoustic ranging sensor satisfies a predetermined threshold condition, e.g. exceeds a threshold.

Covariance or correlation calculated between the audio signal input from two or more microphones to detect a vibration event. This covariance or correlation is calculated by mixing module 7 at the input audio processing step 17 to derive the mixing control signal. For example, a vibration event is detected if the covariance or correlation satisfies a predetermined threshold condition, e.g. exceeds a threshold.

Each of the above inputs is able to substitute for the vibration signals provided from vibration sensors. Using these additional inputs, the vibration activity may not be directly detected as vibrations but a probability or likelihood of a vibration event occurring may be calculated. For example, an optical sensor associated with a microphone module may detect the presence of a person's hand when adjusting a microphone. Based on the intensity of the movement, a likelihood that the movement will give rise to a sufficient level of vibration induced acoustic power (above a predefined threshold) may be recorded. In some embodiments, the modules output a signal having an amplitude proportional to the likelihood of a vibration event occurring. For example, a vibration signal having a large amplitude is associated with a higher likelihood of a vibration event. These likelihood signals can be processed by mixing module 7 in the same manner as described above in relation to the vibration signals so as to modify the contribution of the associated audio signal during high likelihood vibration activity. Determination of the likelihood signals may be performed by mixing module 7 or internally within each microphone module where sufficient processing capability is available. Correlation between this likelihood signal and an associated audio signal could be implemented to provide an increased probability measure that a vibration event has occurred.

Figure 7:
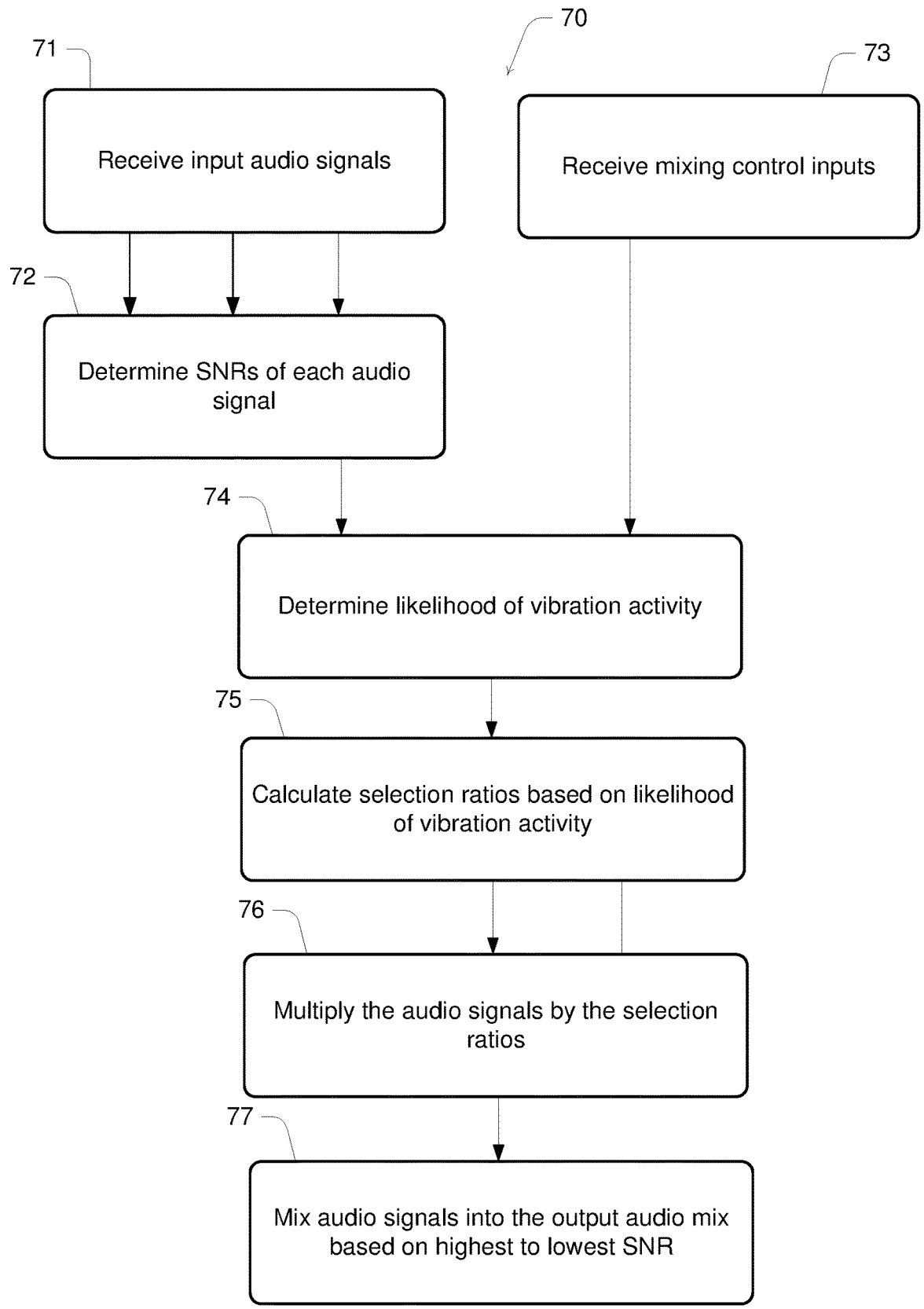
FIG. 7 is a process flow diagram illustrating the primary steps of an audio capture method according to a vibration activity likelihood embodiment of the invention.

The above described vibration likelihood estimation technique is illustrated in the process diagram of FIG. 7, which illustrates the primary steps in an audio capture method 70. Method 70 includes the initial step 71 of receiving the audio signals $s_1(n)$, $s_2(n)$, and $s_3(n)$ from microphones 9-11 positioned to capture audio information from different directions or locations within the audio environment. At step 72, these audio signals are converted to instantaneous SNRs. Simultaneously with steps 71 and 72, at step 73, mixing module 7 receives the various auxiliary mixing control inputs, which contain information indicative of determining vibration activity. These auxiliary inputs include, where available, the signals from vibration sensors, optical sensors, capacitive sensors and acoustic ranging sensors. At step 74, the SNRs and input vibration signals are processed to determine a likelihood of a vibration activity. At step 75 the likelihoods are used as a basis for calculating selection ratios for each microphone module 3-5. Rather than depending directly on the vibration signals $V_i[n]$, a modified version of equation (2) is used wherein $V_i[n]$ is substituted for signals indicative of the likelihood of a vibration event for each microphone module. At step 76, each audio signal is multiplied by its corresponding normalized selection ratio to determine its contribution to the output audio mix. Signals having a high SNR and a low corresponding vibration signal will have a greater selection ratio and hence greater contribution to the output audio mix. Finally, at step 77, the audio signals are mixed together to form the output audio mix.

CONCLUSIONS

It will be appreciated that the above described invention provides significant systems and methods of capturing audio signals while attenuating or suppressing acoustic noise associated with mechanical vibrations such as microphone handling. Exemplary embodiments detect the instance of vibration activity using an auxiliary signal based on mechanical vibration sensing.

Interpretation

Unless specifically stated otherwise, as apparent from the following discussions, it is appreciated that throughout the specification discussions utilizing terms such as "processing," "computing," "calculating," "determining", "analyzing" or the like, refer to the action and/or processes of a computer or computing system, or similar electronic computing device, that manipulate and/or transform data represented as physical, such as electronic, quantities into other data similarly represented as physical quantities.

In a similar manner, the term "processor" may refer to any device or portion of a device that processes electronic data, e.g., from registers and/or memory to transform that electronic data into other electronic data that, e.g., may be stored in registers and/or memory. A "computer" or a "computing machine" or a "computing platform" may include one or more processors.

The methodologies described herein are, in one embodiment, performable by one or more processors that accept computer-readable (also called machine-readable) code containing a set of instructions that when executed by one or more of the processors carry out at least one of the methods described herein. Any processor capable of executing a set of instructions (sequential or otherwise) that specify actions to be taken are included. Thus, one example is a typical processing system that includes one or more processors. Each processor may include one or more of a CPU, a graphics processing unit, and a programmable DSP unit. The processing system further may include a memory subsystem including main RAM and/or a static RAM, and/or ROM. A bus subsystem may be included for communicating between the components. The processing system further may be a distributed processing system with processors coupled by a network. If the processing system requires a display, such a display may be included, e.g., a liquid crystal display (LCD) or a cathode ray tube (CRT) display. If manual data entry is required, the processing system also includes an input device such as one or more of an alphanumeric input unit such as a keyboard, a pointing control device such as a mouse, and so forth. The term memory unit as used herein, if clear from the context and unless explicitly stated otherwise, also encompasses a storage system such as a disk drive unit. The processing system in some configurations may include a sound output device, and a network interface device. The memory subsystem thus includes a computer-readable carrier medium that carries computer-readable code (e.g., software) including a set of instructions to cause performing, when executed by one or more processors, one of more of the methods described herein. Note that when the method includes several elements, e.g., several steps, no ordering of such elements is implied, unless specifically stated. The software may reside in the hard disk, or may also reside, completely or at least partially, within the RAM and/or within the processor during execution thereof by the computer system. Thus, the memory and the processor also constitute computer-readable carrier medium carrying computer-readable code.

Furthermore, a computer-readable carrier medium may form, or be included in a computer program product.

In alternative embodiments, the one or more processors operate as a standalone device or may be connected, e.g., networked to other processor(s), in a networked deployment, the one or more processors may operate in the capacity of a server or a user machine in server-user network environment, or as a peer machine in a peer-to-peer or distributed network environment. The one or more processors may form a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine.

Note that while diagrams only show a single processor and a single memory that carries the computer-readable code, those in the art will understand that many of the components described above are included, but not explicitly shown or described in order not to obscure the inventive aspect. For example, while only a single machine is illustrated, the term "machine" shall also be taken to include any collection of machines that individually or jointly execute a set (or multiple sets) of instructions to perform any one or more of the methodologies discussed herein.

Thus, one embodiment of each of the methods described herein is in the form of a computer-readable carrier medium carrying a set of instructions, e.g., a computer program that is for execution on one or more processors, e.g., one or more processors that are part of web server arrangement. Thus, as will be appreciated by those skilled in the art, embodiments of the present invention may be embodied as a method, an apparatus such as a special purpose apparatus, an apparatus such as a data processing system, or a computer-readable carrier medium, e.g., a computer program product. The computer-readable carrier medium carries computer readable code including a set of instructions that when executed on one or more processors cause the processor or processors to implement a method. Accordingly, aspects of the present invention may take the form of a method, an entirely hardware embodiment, an entirely software embodiment or an embodiment combining software and hardware aspects. Furthermore, the present invention may take the form of carrier medium (e.g., a computer program product on a computer-readable storage medium) carrying computer-readable program code embodied in the medium.

The software may further be transmitted or received over a network via a network interface device. While the carrier medium is shown in an example embodiment to be a single medium, the term "carrier medium" should be taken to include a single medium or multiple media (e.g., a centralized or distributed database, and/or associated caches and servers) that store the one or more sets of instructions. The term "carrier medium" shall also be taken to include any medium that is capable of storing, encoding or carrying a set of instructions for execution by one or more of the processors and that cause the one or more processors to perform any one or more of the methodologies of the present invention. A carrier medium may take many forms, including but not limited to, non-volatile media, volatile media, and transmission media. Non-volatile media includes, for example, optical, magnetic disks, and magneto-optical disks. Volatile media includes dynamic memory, such as main memory. Transmission media includes coaxial cables, copper wire and fiber optics, including the wires that comprise a bus subsystem. Transmission media also may also take the form of acoustic or light waves, such as those generated during radio wave and infrared data communications. For example, the term "carrier medium" shall accordingly be taken to include, but not be limited to, solid-state memories, a computer product embodied in optical and magnetic media; a medium bearing a propagated signal detectable by at least one processor or one or more processors and representing a set of instructions that, when executed, implement a method; and a transmission medium in a network bearing a propagated signal detectable by at least one processor of the one or more processors and representing the set of instructions.

It will be understood that the steps of methods discussed are performed in one embodiment by an appropriate processor (or processors) of a processing (e.g., computer) system executing instructions (computer-readable code) stored in storage. It will also be understood that the invention is not limited to any particular implementation or programming technique and that the invention may be implemented using any appropriate techniques for implementing the functionality described herein. The invention is not limited to any particular programming language or operating system.

Reference throughout this specification to "one embodiment", "some embodiments" or "an embodiment" means that a particular feature, structure or characteristic described in connection with the embodiment is included in at least one embodiment of the present disclosure. Thus, appearances of the phrases "in one embodiment", "in some embodiments" or "in an embodiment" in various places throughout this specification are not necessarily all referring to the same embodiment. Furthermore, the particular features, structures or characteristics may be combined in any suitable manner, as would be apparent to one of ordinary skill in the art from this disclosure, in one or more embodiments.

As used herein, unless otherwise specified the use of the ordinal adjectives "first", "second", "third", etc., to describe a common object, merely indicate that different instances of like objects are being referred to, and are not intended to imply that the objects so described must be in a given sequence, either temporally, spatially, in ranking, or in any other manner.

In the claims below and the description herein, any one of the terms comprising, comprised of or which comprises is an open term that means including at least the elements/features that follow, but not excluding others. Thus, the term comprising, when used in the claims, should not be interpreted as being limitative to the means or elements or steps listed thereafter. For example, the scope of the expression a device comprising A and B should not be limited to devices consisting only of elements A and B. Any one of the terms including or which includes or that includes as used herein is also an open term that also means including at least the elements/features that follow the term, but not excluding others. Thus, including is synonymous with and means comprising.

It should be appreciated that in the above description of example embodiments of the disclosure, various features of the disclosure are sometimes grouped together in a single embodiment, Fig., or description thereof for the purpose of streamlining the disclosure and aiding in the understanding of one or more of the various inventive aspects. This method of disclosure, however, is not to be interpreted as reflecting an intention that the claims require more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this disclosure.

Furthermore, while some embodiments described herein include some but not other features included in other embodiments, combinations of features of different embodiments are meant to be within the scope of the disclosure, and form different embodiments, as would be understood by those skilled in the art. For example, in the following claims, any of the claimed embodiments can be used in any combination.

In the description provided herein, numerous specific details are set forth. However, it is understood that embodiments of the disclosure may be practiced without these specific details. In other instances, well-known methods, structures and techniques have not been shown in detail in order not to obscure an understanding of this description.

Similarly, it is to be noticed that the term coupled, when used in the claims, should not be interpreted as being limited to direct connections only. The terms "coupled" and "connected," along with their derivatives, may be used. It should be understood that these terms are not intended as synonyms for each other. Thus, the scope of the expression a device A coupled to a device B should not be limited to devices or systems wherein an output of device A is directly connected to an input of device B. It means that there exists a path between an output of A and an input of B which may be a path including other devices or means. "Coupled" may mean that two or more elements are either in direct physical, electrical or optical contact, or that two or more elements are not in direct contact with each other but yet still co-operate or interact with each other.

Thus, while there has been described what are believed to be the best modes of the disclosure, those skilled in the art will recognize that other and further modifications may be made thereto without departing from the spirit of the disclosure, and it is intended to claim all such changes and modifications as fall within the scope of the disclosure. For example, any formulas given above are merely representative of procedures that may be used. Functionality may be added or deleted from the block diagrams and operations may be interchanged among functional blocks. Steps may be added or deleted to methods described within the scope of the present disclosure.

Various aspects of the present invention may be appreciated from the following enumerated example embodiments (EEEs):

EEE 1. An audio capture system including:
  two or more microphones positioned to capture respective audio signals from different directions or locations within an audio environment;
  a mixing module configured to mix the audio signals in accordance with a mixing control signal to produce an output audio mix, wherein, upon the detection of vibration activity, the mixing control signal controls the mixing module to selectively temporarily modify one or more of the audio signals to reduce the presence of noise associated with vibration activity in the output audio mix.

EEE 2. An audio capture system according to EEE 1 wherein the modifying of one or more of the audio signals includes weighting the audio signals to reduce their contribution to the output audio mix.

EEE 3. An audio capture system according to EEE 1 wherein the modifying of one or more of the audio signals includes removing the audio signals from the output audio mix.

EEE 4. An audio capture system according to EEE 2 or EEE 3 wherein the mixing module mixes audio signals based on the signal content that maximizes the signal to noise ratio (SNR) of the output audio mix.

EEE 5. An audio capture system according to EEE 4 wherein the modifying of one or more of the audio signals includes modulating the noise component of the SNR of the audio signals with the mixing control signal.

EEE 6. An audio capture system according to EEE 5 wherein the mixing control signal includes a vibration signal from one or more vibration sensors positioned to detect the vibration activity and wherein the vibration activity are determined by direct detection of vibrations from the vibration sensors.

EEE 7. An audio capture system according to any one of EEEs 1 to 5 wherein the vibration activity is determined as a likelihood of sufficient vibration induced acoustic power and the control signal includes a component that is proportional to the likelihood.

EEE 8. An audio capture system according to EEE 6 wherein the one or more vibration sensors are associated with corresponding microphones and, upon detection of vibration activity from a vibration sensor, the mixing module is responsive to the mixing control signal to temporarily attenuate the audio signal from that corresponding microphone.

EEE 9. An audio capture system according to EEE 8 wherein the degree of attenuation of an audio signal is proportional to an amplitude of the vibration signal of the associated vibration sensor.

EEE 10. An audio capture system according to any one of the preceding EEEs wherein the mixing control signal includes input from one or more accelerometers mounted to a corresponding microphone and adapted to detect movement of that corresponding microphone that gives rise to a vibration event.

EEE 11. An audio capture system according to any one of the preceding EEEs wherein the mixing control signal includes input from one or more capacitive sensors adapted to detect proximate hand or user gestures that give rise to a vibration event.

EEE 12. An audio capture system according to any one of the preceding EEEs wherein the mixing control signal includes input from one or more optical sensors adapted to detect movement of objects or people proximal to one or more microphones that gives rise to a vibration event.

EEE 13. An audio capture system according to any one of the preceding EEEs wherein the mixing control signal includes input from one or more acoustic ranging sensors adapted to detect movement of objects or people proximate to one or more microphones that gives rise to a vibration event.

EEE 14. An audio capture system according to any one of the preceding EEEs wherein the mixing control signal includes a covariance or correlation calculated between the audio signal input from two or more microphones to detect vibration activity.

EEE 15. An audio capture system according to any one of the preceding EEEs wherein the mixing control signal determines a 'normal' mixing mode of operation in the absence of vibration activity and a 'vibration' mixing mode of operation upon detection of vibration activity.

EEE 16. An audio capture system according to any one of the preceding EEEs wherein the one or more microphones are positioned arbitrarily within the audio environment.

EEE 17. An audio capture system according to EEE 1 wherein the vibration activity includes one or more of direct vibrations, inferred vibrations, direct movement or inferred movement.

EEE 18. An audio capture method including:
  receiving audio signals from two or more microphones disposed at different directions or locations within an audio environment;
  mixing the audio signals in accordance with a mixing control signal to produce an output audio mix, wherein, upon the detection of vibration activity, the mixing control signal controls the mixing module to selectively temporarily modify one or more of the audio signals to reduce the presence of noise associated with vibration activity in the output audio mix.

EEE 19. An audio capture method, the method including the steps of:
  receiving audio signals from two or more microphones positioned to capture respective audio information from different directions or locations within an audio environment
  receiving one or more inputs indicative of a likelihood of a vibration event;
  deriving, from the one or more inputs, a mixing control signal, the mixing control signal;
  mixing the audio signals in accordance with the mixing control signal to produce an output audio mix, wherein, upon the detection of vibration activity, the mixing control signal selectively temporarily modifies one or more of the audio signals to reduce the presence of noise associated with vibration activity in the output audio mix.

EEE 20. An audio capture method according to EEE 19 wherein the modifying of one or more of the audio signals includes weighting the audio signals to reduce their contribution to the output audio mix.

EEE 21. An audio capture method according to EEE 19 or EEE 20 wherein the signals are mixed based on the signal content that maximizes the signal to noise ratio (SNR) of the output audio mix.

EEE 22. An audio capture method according to EEE 20 wherein the modifying of one or more of the audio signals includes modulating the noise component of the SNR of the audio signals with the mixing control signal.

The invention claimed is:

1. An audio capture system including:
  two or more microphone modules for capturing two or more audio signals from different directions or locations within an audio environment, each of the microphone modules comprising a respective microphone for capturing a respective audio signal of the two or more audio signals and a respective vibration sensor for detecting vibrations of said module, the respective vibration sensor being separate from the microphone, the respective vibration sensor comprising at least one of a contact microphone and an accelerometer; and a mixing module configured to mix the audio signals of the microphone modules to produce an output audio mix, wherein the mixing module is configured to determine a respective gain of each audio signal of the two or more audio signals in the output audio mix based on a respective measure of a signal to noise ratio, SNR, of the corresponding audio signal, wherein the respective measure of the SNR is weighted by a respective weighting factor that is inversely proportional to an amplitude of a vibration signal generated by a corresponding vibration sensor in a microphone module for capturing the corresponding audio signal.

2. The audio capture system of claim 1, wherein the mixing module is configured to determine a selection ratio for each of the microphone modules based on a comparison of a weighted measure of the SNR of the audio signal of said microphone module with the one or more weighted measures of the SNR of the other microphone modules, and the mixing module is configured to determine the respective gain of each audio signal in the output audio mixed based on the determined selection ratio for the corresponding microphone module.

3. The audio capture system according to claim 2, wherein the mixing module is configured to weight the audio signals in the output audio mix according to the calculated selection ratio.

4. The audio capture system according to claim 2, wherein the mixing module is configured to remove at least one of the audio signals from the output audio mix if the selection ratio for said at least one of the audio signals satisfies a predetermined threshold condition, wherein the predetermined threshold condition is satisfied if the selection ratio is below a threshold.

5. The audio capture system according to claim 2, wherein the determining of the selection ratio for each of the microphone modules by the mixing module includes adding a hysteresis parameter to the measure of SNR of the corresponding audio signal.

6. The audio capture system according to claim 1, wherein the weighting factor is determined using a smoothed version of the vibration signal of the vibration sensor.

7. The audio capture system according to claim 1, wherein the mixing module is configured to determine the respective gain of each audio signal in the output audio mix based on the weighted measure of the SNR of the corresponding audio signal if input from one or more capacitive sensors adapted to detect proximate hand or user gestures is indicative of a vibration event.

8. The audio capture system according to claim 1, wherein the mixing module is configured to determine the respective gain of each audio signal in the output audio mix based on the weighted measure of the SNR of the corresponding audio signal if input from one or more optical sensors adapted to detect movement of objects or people proximal to one or more microphones is indicative of a vibration event.

9. The audio capture system according to claim 1, wherein the mixing module is configured to determine the respective gain of each audio signal in the output audio mix based on the weighted measure of the SNR of the corresponding audio signal if input from one or more acoustic ranging sensors adapted to detect movement of objects or people proximate to one or more microphones is indicative of a vibration event.

10. The audio capture system according to claim 1, wherein the mixing module is configured to determine the gain of each audio signal in the output audio mix based on the weighted measure of the SNR of the corresponding audio signal if a covariance or correlation calculated between the audio signal input from two or more microphones is indicative of a vibration event.

11. A method, comprising:

receiving two or more audio signals captured by two or more microphone modules from different directions or locations within an audio environment, each of the microphone modules comprising a respective microphone for capturing a respective audio signal of the two or more audio signals and a respective vibration sensor for detecting vibrations of said module;

receiving a vibration signal from a respective vibration sensor included in each of the microphone modules, the respective vibration sensor being separate from the microphone, the vibration sensor comprising at least one of a contact microphone and an accelerometer; and mixing the received two or more audio signals to produce an output audio mix, the mixing comprising: determining a respective gain of each of the received two or more audio signals in the output audio mix based on a respective measure of a signal to noise ratio, SNR, of the corresponding audio signal, wherein each measure of the SNR is weighted by a respective weighting factor that is inversely proportional to an amplitude of the vibration signal received from a corresponding vibration sensor in a microphone module for capturing the corresponding audio signal.

12. The method of claim 11, the mixing comprising:

determining a selection ratio for each of the microphone modules based on a comparison of the weighted measure of the SNR of the audio signal of the each microphone module with the one or more weighted measures of the SNR of the other microphone modules, wherein determining the respective gain of each audio signal in the output audio mixed is based on the determined selection ratio for the corresponding microphone module.

13. The method of claim 11, wherein each weighting factor is determined using a smoothed version of the vibration signal of the respective vibration sensor.

14. The method of claim 11, wherein determining the respective gain of each of the received audio signals occurs in response to determining that input from one or more capacitive sensors adapted to detect proximate hand or user gestures is indicative of a vibration event.

15. The method of claim 11, wherein determining the respective gain of each of the received audio signals occurs in response to determining that input from one or more optical sensors adapted to detect movement of objects or people proximal to one or more microphones is indicative of a vibration event.

16. The method of claim 11, wherein determining the respective gain of each of the received audio signals occurs in response to determining that a covariance or correlation calculated between the audio signal input from two or more microphones is indicative of a vibration event.

17. A non-transitory computer-readable storage medium having stored thereon computer-executable instructions that, when executed by one or more processors, cause the one or more processors to perform operations comprising:

receiving two or more audio signals captured by two or more microphone modules from different directions or locations within an audio environment, each of the microphone modules comprising a respective microphone for capturing a respective audio signal of the two or more audio signals and a respective vibration sensor for detecting vibrations of said module;

receiving a vibration signal from a respective vibration sensor included in each of the microphone modules, the respective vibration sensor being separate from the microphone, the vibration sensor comprising at least one of a contact microphone and an accelerometer; and mixing the received two or more audio signals to produce an output audio mix, the mixing comprising: determining a respective gain of each of the received two or more audio signals in the output audio mix based on a respective measure of a signal to noise ratio, SNR, of the corresponding audio signal, wherein each measure of the SNR is weighted by a respective weighting factor that is inversely proportional to an amplitude of the vibration signal received from a corresponding vibration sensor in a microphone module for capturing the corresponding audio signal.

\* \* \* \* \*